United States Patent
Rybicki

[11] 3,782,854
[45] Jan. 1, 1974

[54] ELASTOMERIC BEARING FOR A HELICOPTER ROTOR

[75] Inventor: Robert C. Rybicki, Trumbull, Conn.

[73] Assignee: United Aircraft Corporation, East Hartford, Conn.

[22] Filed: July 5, 1972

[21] Appl. No.: 268,963

[52] U.S. Cl. ............................ 416/134, 416/141
[51] Int. Cl. ............................................ B64c 27/38
[58] Field of Search ................... 416/134, 141, 107, 416/140

[56] References Cited
UNITED STATES PATENTS

| | | | |
|---|---|---|---|
| 3,106,965 | 10/1963 | Gorndt et al. | 416/134 |
| 3,282,350 | 11/1966 | Kisovec | 416/134 |
| 3,292,712 | 12/1966 | Schmidt | 416/134 |
| 3,501,250 | 3/1970 | Mosinskis | 416/134 X |
| 3,556,673 | 1/1971 | Killian | 416/134 |
| 3,652,185 | 3/1972 | Cresap et al. | 416/134 |
| 3,700,352 | 10/1972 | Gorndt | 416/134 |

*Primary Examiner*—Everette A. Powell, Jr.
*Attorney*—Vernon F. Hauschild

[57] ABSTRACT

An elastomeric bearing comprising two elastomeric bearings in series connecting a helicopter blade to a helicopter rotor hub so as to be articulated and have at least three degrees of freedom, namely, flapping motion, lead-lag motion and pitch motion, and wherein said bearing occupies minimal space envelope and the two elastomeric bearings thereof share the motion in at least one of the degrees of freedom.

20 Claims, 11 Drawing Figures

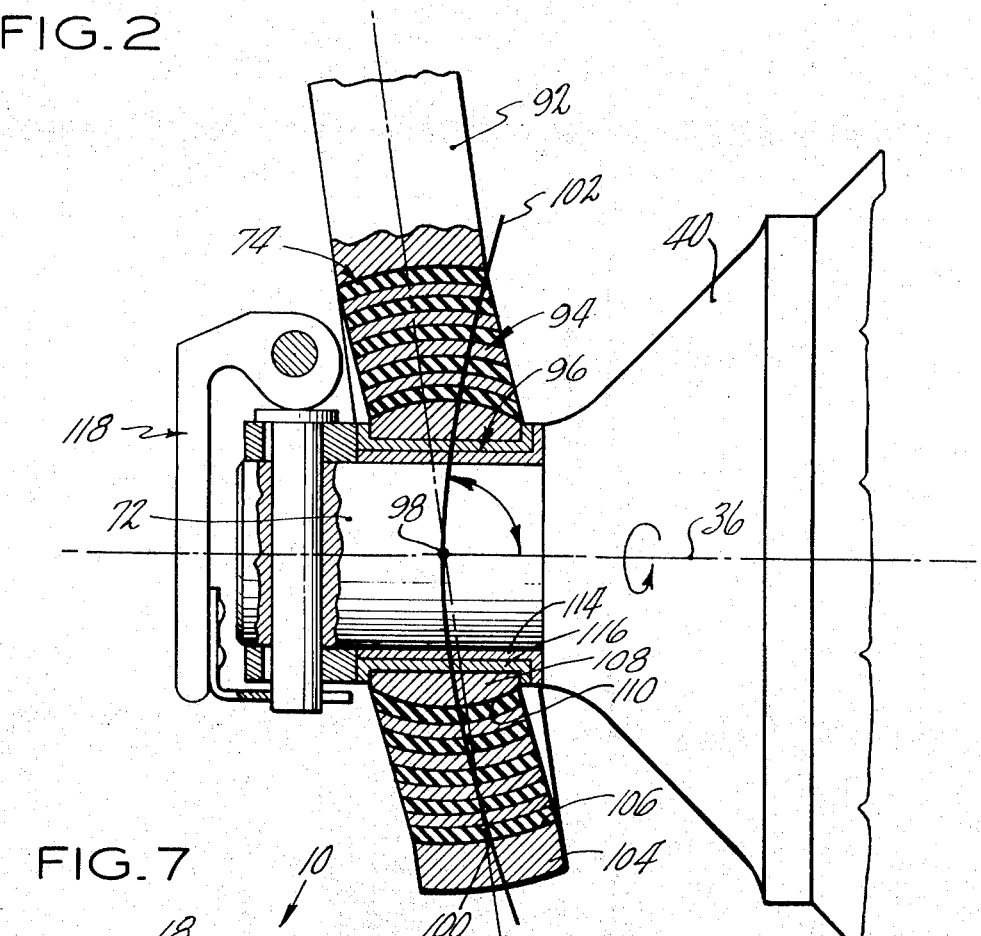

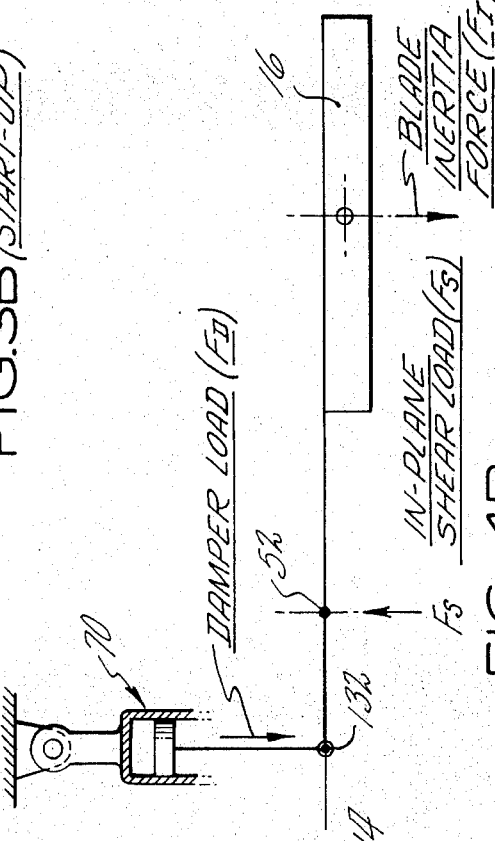
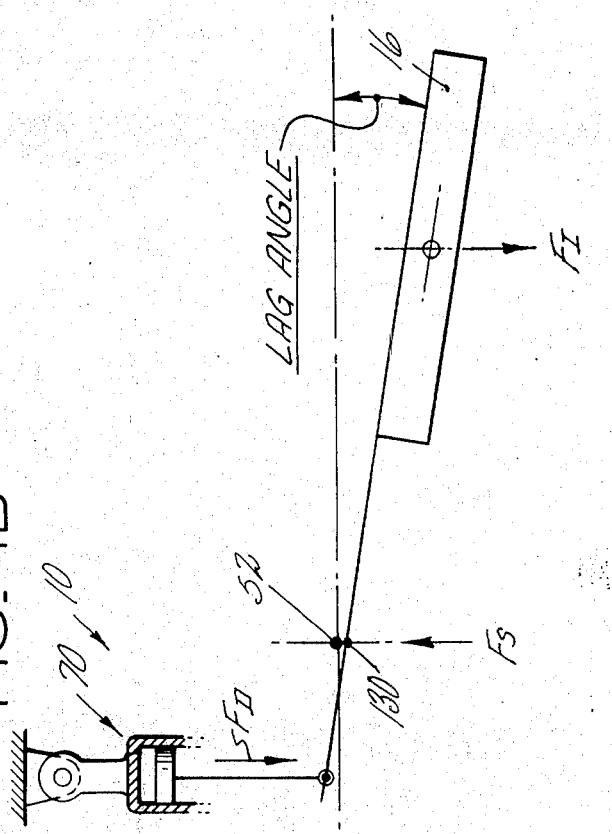
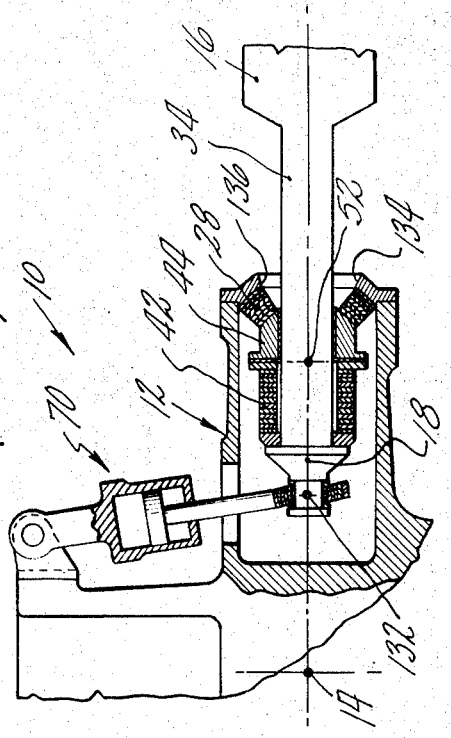
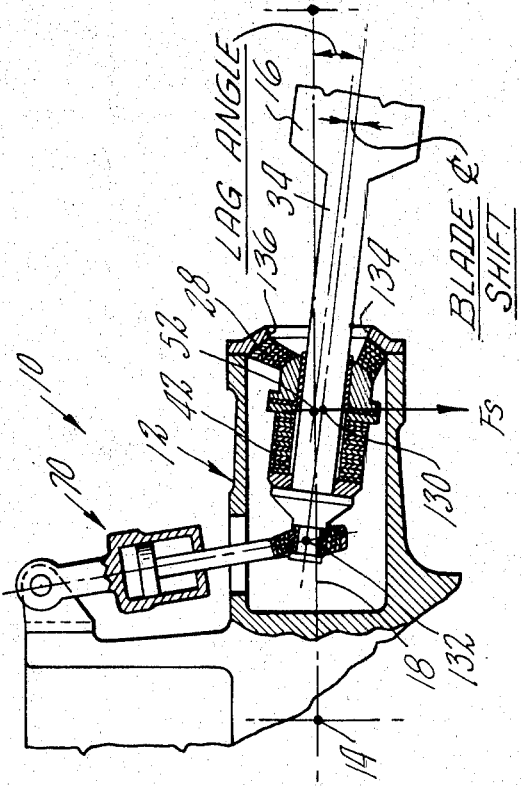

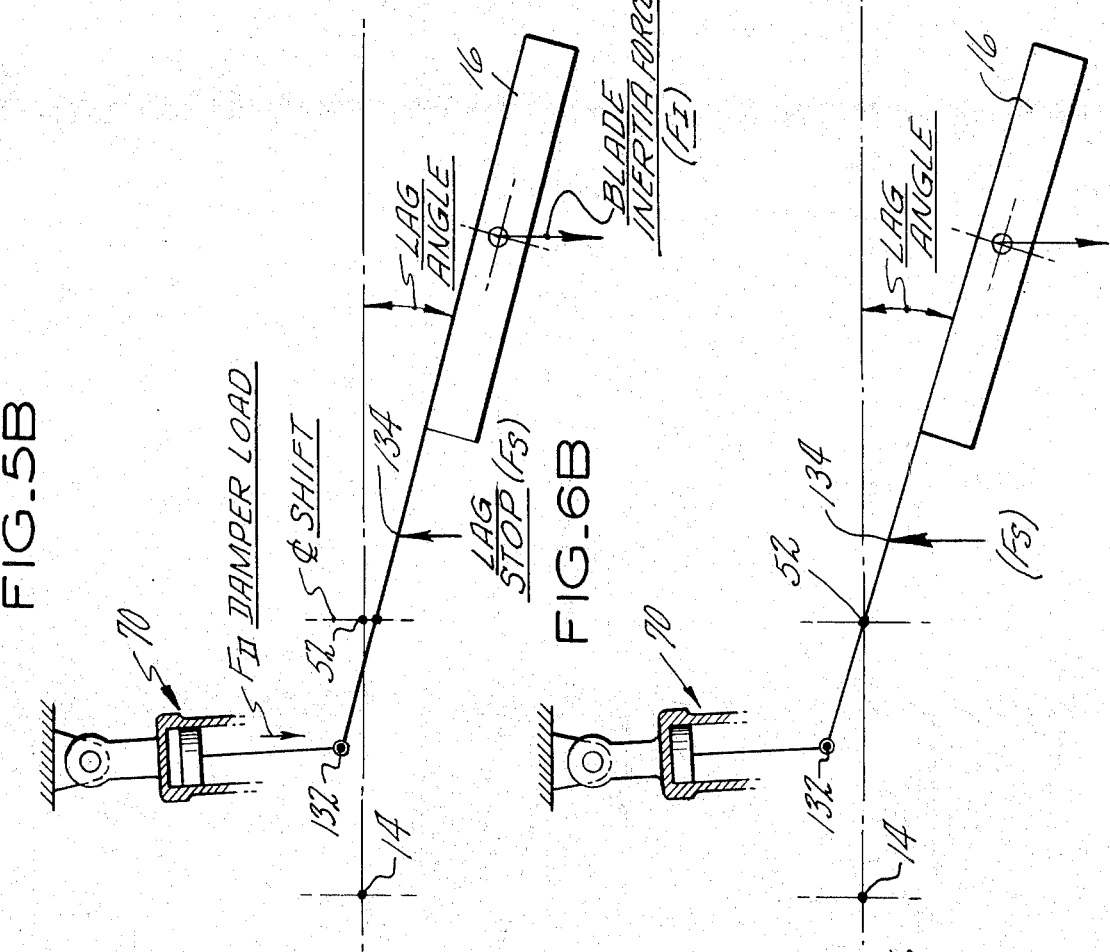

ELASTOMERIC BEARING FOR A HELICOPTER ROTOR

CROSS-REFERENCES TO RELATES APPLICATIONS

Some of the subject matter shown and claimed in this application Ser. No. 268,962 is disclosed and claimed in a copending application entitled "Articulated Helicopter Rotor Utilizing Plural Elastomeric Bearings for Articulated Support of the Blade from the Rotor Hub" filed on even date, a copending application Ser. No. 268,964 entitled "Articulated Helicopter Rotor" filed on even date, and a copending application Ser. No. 268,965 entitled "Compound Bearing for Connecting a Helicopter Blade to a Helicopter Rotor" filed on even date.

BACKGROUND OF THE INVENTION

1. Field of the Invention

This invention relates to bearings connecting a helicopter blade to a helicopter rotor hub so as to produce an articulated rotor allowing blade motion in flapping, lead-lag and pitch change, and wherein the bearing occupies minimal space envelope.

2. Description of the Prior Art

In the rotor head bearing art for articulated rotors, it has been conventional to mount the blade so as to be connected to the hub through a flapping bearing and a lead-lag bearing, usually of the journal type, and also through a stack bearing to permit blade pitch change motion, which stack bearing is usually a buildup of a series of anti-friction bearings. This prior art, multiple metal bearing construction, is heavy, requires continuous lubrication and vigilant maintenance.

It has been known for some time that the use of elastomeric bearings in this environment would eliminate weight, the need of lubrication and would minimize maintenance. It has not been possible to utilize elastomeric bearings in this environment to satisfy the specific requirements of the rotor head of interest herein, namely, freedom of motion in three degrees, namely, flapping, lead-lag and pitch change, while being able to fit the bearing into a minimal space envelope.

Generally speaking, the advantage of an elastomeric bearing over a conventional bearing is a higher degree of reliability and less maintenance requirements. In comparing an elastomeric bearing to an anti-friction bearing, such as a ball or roller bearing, the elastomeric bearing has no need for lubricant, has no need for the seals required to confine the lubricant in the bearing regions, and accordingly has no need for the maintenance necessary to keep the lubrication system properly operating. In comparing an elastomeric bearing to a conventional sliding-type bearing, such as a Teflon journal bearing, the life expectancy of an elastomeric bearing is cnnsiderably higher.

French Pat. No. 934,336, issued to Rene Dorand in 1948, taught the use of an elastomeric bearing in the helicopter rotor environment. U.S. Pat. No. 1,921,931 to Levasseur dated Aug. 8, 1933 taught the use of an elastomeric bearing in a propeller environment. Each of these patents, however, would be incapable of providing a joint with the three degrees of freedom required by modern helicopter rotors throughout the freedom ranges required today, and with minimum space envelope. For example, the modern helicopter blade goes through a flapping motion of about 30°, a lead-lag motion of about 20°, and a pitch change motion of about 60°. To attempt to utilize the construction of either Dorand or Levasseur in this environment would necessitate the use of an elastomeric bearing of such a tremendous size that it would be incompatible with helicopter rotor space envelope requirements. It must be borne in mind that as the space envelope of the helicopter rotor increases, the rotor weight and drag increase and hence the efficiency of the helicopter is drastically cut thereby.

Gorndt et al. U.S. Pat. No. 3,106,965 introduced the concepts of interlocking yokes between the blade and the hub to cooperate with a single elastomeric bearing in the rotor head environment. This construction presents a space envelope problem, however, both with respect to the volume occupied by the interlocking yokes and the size of the single elastomeric bearing required to produce the three degress of freedom mentioned above throughout the required ranges.

Gorndt et al. U.S. Pat. No. 3,111,172 teaches the use of cooperating elastomeric bearings, however, it should be noted that the Gorndt et al. elastomeric bearings are performing different functions than are mine, one carrying the thrust load and the other serving as a centering bearing, and that there is no motion sharing between the two elastomeric bearings.

Hinks U.S. Pat. No 2,900,182 includes an excellent dissertation on the structure of elastomeric bearings per se and amply illustrates a spherical elastomeric bearing, a cylindrical elastomeric bearing, and a stacked, flat or disc-type elastomeric bearing, however, Hinks does not teach motion sharing between two elastomeric bearings.

There are other patents which teach plural bearings of the elastomeric type but none of these teach bearing motion sharing as in this invention. Such patents include Schmidt U.S. Pat. No. 3,292,712 which teaches two elastomeric bearings which are not positioned in series so that there is no motion sharing therebetween. Killian U.S. Pat. No. 3,556,673 teaches a plurality of elastomeric bearings but in a rigid rotor environment, as opposed to the articulated rotor environment of this invention, and there is no motion sharing between the Killian elastomeric bearings. Mosinskis U.S. Pat. No. 3,501,250 teaches two bearings in the rotor head environment but it should be noted that only one of these bearings is an elastomeric bearing and that the second is a nonelastomeric centering bearing. Ballaeur U.S. Pat. No. 3,200,887 also teaches the use of two elastomeric bearings but does not teach motion sharing between the bearings.

Peterson U.S. Pat. No. 3,257,826 utilizes two elastomeric bearings in a nonanalogous coupling environment. It should be noted that the bearings of Peterson are incapable of motion sharing and sharing loading comparable to blade centrifugal loading because of their orientation.

Behnke U.S. Pat. No. 2,819,105 teaches the use of elastomeric bearings in a nonanalogous oscillating joint environment but the Behnke construction would be incapable of operating in the helicopter rotor environment because his construction either does not allow the required three degrees of freedom or has its elastomeric bearings oriented so that they are not capable of withstanding the loadings involved, such as centrifugal loading.

SUMMARY OF THE INVENTION

A primary object of the present invention is to provide a bearing between the blade and hub of an articulated helicopter rotor which permits 3° of freedom of blade motion over substantial motion ranges, and which occupies a minimal space envelope.

In accordance with the present invention, the helicopter blade is capable of flapping motion of about 30°, lead-lag motion of about 20°, and pitch change motion of about 60°.

In accordance with the present invention, the bearing between the helicopter blade and rotor consists of two elastomeric bearings positioned in series so that in at least one of the 3° of motion freedom, the elastomeric bearings share the required degree of motion.

In accordance with a further aspect of the present invention, one of the elastomeric bearings is a spherical bearing whose center is coincident with the blade flapping and lead-lag axis and which accommodates the blade flapping and lead-lag motion as well as part of the blade pitch change motion, and the second bearing is a stacked or disc elastomeric bearing positioned in series with respect to the spherical elastomeric bearing and which coacts therewith in carrying the blade centrifugal loading to the hub and which further coacts therewith in sharing the blade pitch change motion.

Other objects and advantages of the present invention may be seen by referring to the following description and claims, read in conjunction with the accompanying drawings.

BRIEF DESCRIPTION OF THE DRAWINGS

FIG. 2 is an enlarged showing of the compound bearing connecting the blade lead-lag damper to the blade stub-shaft.

FIGS. 3a and 3b are showings of a helicopter blade connected to the hub through my bearing joint, with FIG. 3a showing the blade and its "at rest" or normal flight condition, and FIG. 3b constituting a diagrammatic representation of the forces acting upon the blade at the moment of rotor start-up.

FIGS. 4a and 4b are showings of the blade in an early stage of rotor start-up, with FIG. 4a showing the position of the blade in this early stage of rotor start-up and FIG. 4b illustrating the forces acting upon the blade during this early stage of rotor start-up.

FIGS. 5a and 5b correspond to FIGS. 44a and 4b but show the blade in a more advanced rotor start-up position and illustrate the forces acting thereon in this more advanced position of rotor start-up.

FIGS. 6a and 6b show the blade in its fully supported position during rotor start-up, with FIG. 6a showing the blade so positioned, and FIG. 6b diagrammatically showing the forces acting on the blade so positioned.

FIG. 7 is a showing of a droop stop which may be used with my joint.

DESCRIPTION OF THE PREFERRED EMBODIMENT

Figure 1:
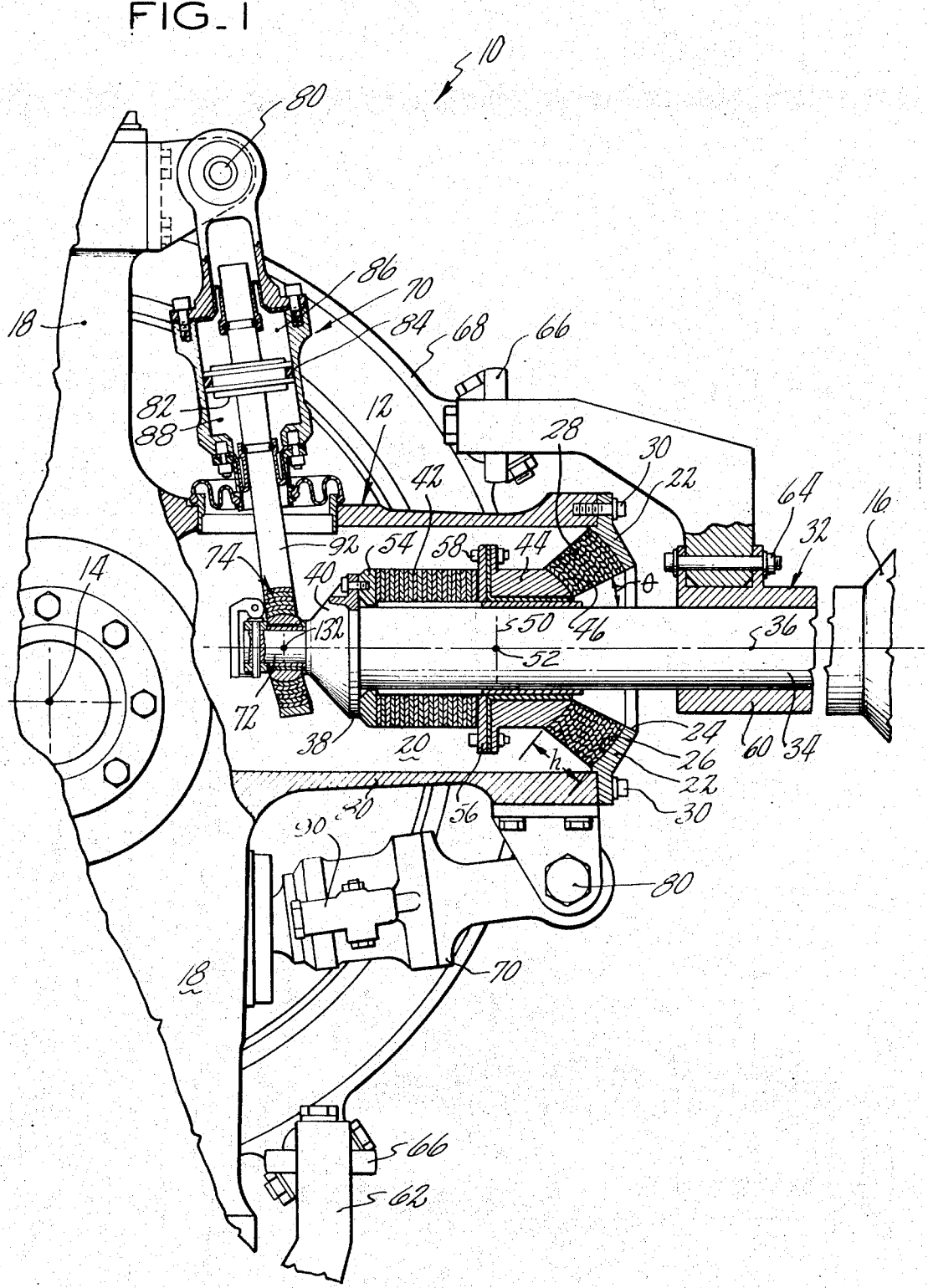
FIG. 1 is a top view of a portion of an articulated helicopter rotor head using my invention and partially broken away for purposes of illustration.

Referring to FIG. 1 of the drawings, we see a portion of helicopter articulated rotor head 10 which comprises hub member 12 mounted for rotation in conventional fashion about axis of rotation 14. A plurality of helicopter blades 16 are supported substantially radially from hub 12 for rotation therewith about axis 14 so as to generate lift for the helicopter in conventional fashion. It should be borne in mind that while a single blade is shown in the drawing, there are actually a number of such blades, possibly four. Hub 12 includes a chamber defining housing 18 for each blade which defines blade attachment chamber 20 therewithin. Housing 18 is preferably substantially cylindrical and extends substantially radially with respect to axis of rotation 14. Housing 18 may include as an integral part thereof, mouth-shaped member 22 which defines a substantially circular opening 24 from chamber 22 and which also defines the spherical surface 26 of the outer race of the laminated spherical, annular, elastomeric bearing 28. Preferably, as shown in the drawing, the outer race member 22 is separate from and connected to housing 18 by conventional connecting means 30.

Blade 16 is connected to hub 12 by blade connecting means 32, which comprises shaft member 34 which is preferably positioned concentrically about the blade feathering or pitch change axis 36 and which has flanged or mushroom-shaped inner end 38. End 38 preferably includes a stub-shaft 40 which may be integral with shaft 34 or separate therefrom and connected thereto by conventional connecting means, not shown. Shaft 34 is connected to housing 18 through annular, flat or disc-type elastomeric bearing 42, connecting member 44, and annular spherical elastomeric bearing 28. Bearings 42 and 28 are preferably of the laminated type more fully disclosed in Hinks U.S. Pat. No. 2,900,182 with flat bearing 42 being of the type shown generally in FIG. 7 thereof and spherical bearing 28 being of the type shown generally in FIG. 8 thereof. Spherical bearing 28 comprises a plurality of spherically shaped laminates which are alternately elastomeric and rigid material such as metal, and which are bonded together. The inner elastomeric laminate is bonded to spherical surface 46 of connector member 44. The spherical laminates and surfaces 46 and 26 are centered about the intersection of blade lead-lag axis 42 and blade flapping axis 50, which is perpendicular to axis 52, and which intersection also includes blade feathering axis 36. Bearing 42 consists of a stacked plurality of annular flat discs comprising alternately positioned elastomeric and metal disc members bonded together and with one end elastomeric disc bonded to race or end plate 54 and at the opposite end to race 56, which may be an integral part of connecting member 44 or connected thereto by conventional connecting means such as bolt and nut mechanism 58. The elastomeric discs of bearings 28 and 42 may be made of natural rubber, while the rigid discs are made of steel or titanium. At its opposite end, shaft 34 supports sleeve 60 which, in turn, supports blade 16 for rotation therewith about feathering axis 36. Pitch horn 62 is connected to sleeve 60 by conventional connecting means 64 and is connected at its opposite end to rod-end bearing 66 of the pitch control rod, which is connected at its opposite end in conventional fashion to conventional swashplate 68 so that swashplate motion causes the blades 16 to vary in pitch about axis 36 either collectively or cyclically.

It will therefore be seen that blade 16 is connected to hub 12 through sleeve 60, shaft 34, disc-type bearing 42, connector member 44 and spherical bearing 28, which connects to hub housing 18. It will also be noted that the elements just enumerated, including bearings 42 and 28 are positioned in series relationship to one another.

A shear bearing 71, which is of the plain bearing type, is shown positioned between shaft 34 and member 44, however, it should be noted that this construction uses no centering bearing for bearings 42 and 28.

A lead-lag damper 70, which is of the hydraulic or pneumatic cylinder-piston type, connects to journal portion 72 of stub-shaft portion 40 of shaft 34 through bearing member 74 and serves to dampen the lead-lag motion of blade 16 about lead-lag axis 52. Such a damper is provided for each blade.

With the rotor construction shown in FIG. 1, blade 16 is mounted so as to articulate with respect to hub 12 and has freedom of motion with respect to hub 12 about feathering axis 36 for pitch change motion, about lead-lag axis 52 for lead-lag motion, and about flapping axis 50 for flapping motion. The blade flapping motion, which has a range of about 30°, and the blade lead-lag motion, which has a range of about 20°, is accommodated by spherical bearing 28. THe pitch change motion, which has a range of about 60°, cannot be accommodated by any single, practically sized elastomeric bearing and, because spherical bearing 28 and flat bearing 42 are connected in series, these two bearings share the pitch change motion of the blade. During normal rotor operation, spherical bearing 28 absorbs both the rotor in-plane shear loads and the rotor out-of-plane shear loads, while both bearings 42 and 28 react the blade centrifugal loading.

As stated previously, it is an object of my invention to provide a bearing in an articulated rotor which provides three degrees of freedom of the blade with respect to the rotor over substantial ranges of motion, and which can be contained within a minimal space envelope, thereby holding rotor weight and drag to a minimum. The prior art interlocking yoke design will not provide the minimal space envelope desired. It was therefore decided to pass the blade or its retainer through the bearing in an attempt to reduce the space envelope. While a single bearing construction might be utilized in a helicopter rotor having minimal blade motion as by Dorand, it could not be utilized in the helicopter rotor of interest having a lead-lag range of about 20°, a flapping range of about 30°, and a pitch change range of about 60°. One of the limitations of an elastomeric bearing is the degree of motion which any one bearing can accommodate in any degree of freedom. To accommodate motion freedom over the extensive ranges of interest would have required a tremendously large single elastomeric bearing, and this would be intolerable from a minimum space envelope and rotor drag and weight standpoint. It was realized that a spherical bearing would be needed to provide blade freedom of motion about the lead-lag and flapping axes, however, because such a spherical bearing tapers away from thru-shaft 34 as shown at angle $\phi$ so as to increase the space envelope required for the bearing, an objective of this invention is to keep the height h of the spherical bearing to a minimum, and thereby maintain the bearing space envelope at a minimum. It was decided that a spherical bearing sized only to accommodate the required lead-lag and flapping motion would be of minimum height and would also be capable of accommodating a portion of the required pitch change motion. It was further decided that the remainder of required pitch change motion could be accommodated by a flat, elastomeric disc bearing placed in series which would not increase the rotor space envelope.

An advantage of my in-series elastomeric bearing arrangement is that the torsional stiffness of bearings 28 and 42 can be controlled so that each bearing accommodates the proportional amount of pitch change motion desired to achieve the minimum rotor space envelope. The torsional stiffness of bearings 28 and 42 can be controlled by varying the size and thickness of the elastomeric laminates and by varying the durometer and shear modulus of the elastomer itself. The preferred stiffness ratio in the case of interest is 3:1 with bearing 28 accommodating 25 percent of the required pitch change motion and bearing 42 accommodating the remaining 75 percent of the required pitch change motion. Such a bearing stiffness ratio, while not essential to my bearing arrangement, provides the advantage of a minimal size spherical bearing 28, and thereby produces an arrangement of minimal space envelope.

Whether or not shear bearing 71 is required would depend upon the amount of rotor in-plane and rotor out-of-plane shear loads which must be passed through bearing 42 and the shear load capacity of bearing 42. In a low shear load situation, shear bearing 71 would not be necessary and it should be borne in mind that bearing 71 merely serves to carry the shear loads of the rotor across bearing 42 and is not a centering bearing for the elastomeric bearings 42 and 28 in so far as it does not provide a fixed pivot for blade 16. In this bearing design, a centering bearing is not needed because bearing 28 provides the fixed pivot for blade 16 during normal operation. Larger excursions of blade 16 about the flap axis 50 and lead-lag axis 42 are restrained by the coaction of damper 70 and shaft 34 abutting fixed surface 24 of housing 18 or bearing outer race 22 so as to establish two hard points for blade support.

Lead-lag damper 70 is pivotally connected to hub 12 by conventional spherical joint 80 and is connected at its opposite end to the journal portion 72 of thru-shaft 34 by bearing 74. Damper 70 is basically a piston member 82 within cylinder 84 and hydraulic fluid is selectively conveyed between chambers 86 and 88 through conventional chamber connecting mechanism 90 so that damper 70 serves to dampen blade lead-lag motion about lead-lag axis 52.

A unique feature of this construction is the bearing 74 used to connect damper 70 to the blade. To be consistent from a bearing reliability standpoint, with the remaining bearings of the system, it was decided to substitute an elastomeric bearing for the conventional spherical rod-end bearing between damper piston shaft 92 and the journal portion 72 of thru-shaft 34. Because bearing 74 must be able to accommodate the pitch change motion of blade 16, together with other motions, and because this pitch change motion is as high as 60°, it was not possible to use a single elastomeric bearing in this location within reasonable space limitations because, as previously mentioned, an elastomeric bearing of given size is limited with respect to the amount of torsional motion which can accommodate. Accordingly, as best shown in FIG. 2, bearing 74 comprises two parts, an elastomeric portion 94 enveloping a slip-type journal bearing portion 96. The arrangement of these two bearing portions is such that bearing 96 accommodates all pitch change motion with respect to damper rod 92 and elastomeric bearing 94 accommodates all misalignment motion between the blade thru-shaft 34 and damper piston rod 92. This misalignment motion which the elastomeric portion 94 of bearing 74 must accommodate is caused by the fact that as the blade moves in lead-lag motion, damper 70 is caused to pivot about its pivot point 80 and the center 98 of bearing 74 is caused to follow the arc described by the motion of center point 98 about the blade lead-lag axis 52, in other words, the arc between station 100 and 102 shown in FIG. 2. Accordingly, the angle between damper shaft 92 and blade 16 changes continuously between outboard ranges 100 and 102 as the blade moves in lead-lag motion and it is this change in angle between the damper shaft 92 and blade axis 36 which produces the misalignment in bearing 74 which the elastomeric portion 94 thereof must accommodate. All blade pitch change motion is accommodated in bearing 74 by the slip-type journal bearing portion 96 thereof, due to its low friction or low stiffness quality when compared to the torsional stiffness of elastomeric portion 94. The elastomeric portion 94 of bearing 74 consists of outer bearing race 104, which is substantially a ring connected to or projecting from damper shaft 92 and having a spherical inner surface 106 positioned concentrically about bearing center 98. Elastomeric bearing inner race 108 is supported concentrically about journal portion 72 of through-shaft 34 by the slip-type journal bearing 96 and includes outer spherical surface 110, which is also centered about center 98. A plurality of spherical laminates of elastomer material and rigid material are alternately positioned between surfaces 110 and 106 and with the end elastomer laminates bonded thereto and bonded to each other in spherical elastomeric bearing fashion. The elastomer laminates may be made of natural rubber and the rigid laminates may be made of steel or titanium.

The slip-type journal bearing 96 is a concentric sleeve arrangement with inner sleeve 114 which is connected by pinning or other convenient fashion to the journal portion 72 of shaft 34 and outer sleeve 116 is connected in some convenient fashion, such as pinning, to the inner race 108 of elastomeric bearing 94. The two sleeves 114 and 116 are of substantially U-shape cross section so as to be retained in concentric alignment about axis 36 and to be relatively movable with respect to one another. Conventional retaining mechanism 118 serves to retain sleeves 114 and 116 on shaft 36. Sleeves 114 and 116 are preferably made of steel and Teflon or carbon/ceramic.

It will accordingly be seen that bearing 74 is actually a double bearing construction, including elastomeric portion 94 and slip-type journal bearing 96 and that this construction achieves a small envelope rod-end bearing which has improved performance over a conventional all elastomeric rod-end bearing. The reason for the improved performance is the reduction in the shear strain in the elastomer of bearing 74. This reduction in shear strain in the elastomer is achieved by eliminating the requirement of the elastomer to absorb pitch change motion, as would be required in a single elastomeric bearing. In bearing 74, slip-type journal bearing 96 accommodates all pitch change motion, while elastomeric portion 94 thereof accommodates the required misalignment described supra. For these reasons, bearing 74 is superior to an all-elastomeric bearing in this environment. In addition, bearing 74 is superior to a spherical sliding bearing arrangement in this environment in that sleeves 114 and 116 are always in the same relationship to one another and therefore any solid lubricant or preferred bearing surfaces between the two parts remains intact and uncontaminated whereas, in the spherical bearing, the ball portion is intermittently exposed from the journal portion and any solid lubricant between the two is lost in this fashion and contaminates are admitted between the ball and journal.

It will therefore be seen that bearing 74 utilizes the best features of an elastomeric bearing in that the elastomeric portion thereof need not have large shear load carrying capabilities since it is not subject to pitch change motion, and the best features of a dry lubricated type of bearing since that portion of the bearing is a slip-type journal bearing and not the conventional spherical bearing.

Pitch control rod-end bearing 66 is preferably of the same construction as bearing 74 because it takes the same types of axial rotation and misalignment motions.

As is mentioned earlier, it is an important feature of my bearing construction, that a centering bearing is not used, thereby eliminating its attendant weight and mechanical complication. The previously identified French Pat. No. 934,336 to Dorand taught the concept of utilizing a spherical elastomeric bearing in this rotor head environment, however, there are certain operating conditions in a rotor, namely, the rotor starting and the rotor braking conditions, when the spherical elastomeric bearing needs assistance from other sources in carrying shear loads for reasons to be explained hereinafter. U.S. Pat. Nos. 3,501,250 and 3,111,172 provided this assistance to the spherical elastomeric bearing by utilizing centering bearings together therewith. The centering bearings are heavy, tend to be complicated, and are utilized only during the short term regimes of rotor starting and rotor braking, and perform no useful function during the normal operation of the rotor. Further, space limitations may make the incorporation of a centering bearing difficult or impossible in the preferred embodiment. It is therefore an important teaching of this application to eliminate centering bearings by utilizing the blade-to-hub bearing combination taught herein. For an explanation of how my rotor is constructed so as to afford assistance to the spherical bearing 28 during the rotor starting and braking operation, reference will not be made to FIGS. 3a and 3b through FIGS. 6a and 6b. Considering FIG. 3a as initially representing the condition of the rotor during normal flight operation, spherical bearing 28 is under high centrifugal loading so that the laminates thereof are heavily compacted and have high shear load carrying capacity such that small angular deflections, due to lead-lag or flapping of the blade, are reacted by the spherical bearing 28. When the rotating rotor is braked, or when the rotor which is at rest is started, the centrifugal load is very low due to the slow rotor speed, yet the rotor torque is high due to the starting or braking rotor in-plane shear forces generated by the rotor changing speed and imparting that change to the blades. The low centrifugal force loading of the spherical bearing 28 causes the spherical bearing to lose its compaction and hence its good shear load carrying capabilities and high in-plane rotor shear forces cause the bearing to yield laterally. We must accordingly compensate for this starting and braking condition situation and a description of my alternative to the use of a centering bearing will now be made.

Considering a rotor starting or start-up situation, wherein it may be considered that the rotor of FIG. 3a is at rest, when the rotor hub 12 commences to rotate, it imparts in-plane shear load $F_S$ to the blade at the blade lead-lag axis 52 and the inertia of blade 16 imparts force $F_I$ at the blade C.G. while the lead-lag damper 70 imparts a damper load $F_D$ in the directions shown in FIG. 3b. Lead-lag axis accordingly becomes the pivot point for blade 16 for loads $F_D$ and $F_I$ to act about and, due to the superiority of force $F_I$, the blade commences to rotate in a clockwise direction about pivot point 52. Under this force balance condition, the blade will pivot clockwise to its FIG. 4a and 4b position wherein the blade has moved through the lag angle indicated and, because the forces acting on the blade have overcome the shear load carrying capability of spherical bearing 28 the bearing has yielded laterally and the blade centerline shifts laterally so that the blade center of flexure shifts from lead-lag axis 52 to station 130 as shown in FIG. 4b. The piston of damper 70 is being forced toward its bottom-out position as blade 16 moves from its FIG. 3a to its FIG. 4a position. As the clockwise motion of blade 16 continues beyond the FIG. 4a position, the blade will eventually bottom-out on lag stop 134, as shown in FIGS. 5a and 5b and it will be noted that lag stop 134 is positioned radially outward or to the right of lag axis 52. This bottoming-out of the blade on lag stop 134 relieves, at least in part, the shear loading on the spherical bearing 28, and although the lag angle has increased between the FIG. 4 and 5 positions, the piston of damper 70 has not yet bottomed-out. As blade 16 now pivots about lag stop 134, the damper piston eventually bottoms-out so as to give the blade 16 two hard stops, namely, lag stop 134 and point 132 of the bottomed-out damper 70, thereby completely relieving spherical bearing 28 of its shear loading. In practice, when blade 16 engages lag stop 134 in the FIG. 5 condition, the in-plane rotor shear load reaction shifts from the spherical bearing to the stop 134 and as the damper 70 bottoms-out as shown in FIG. 6 the blade centerline reverts to its original position so that blade 16 is again supported about the point of intersection of axes 36, 50 and 52, with the centerline of shaft 34 passing therethrough, blade lag motion stops suddenly and damper 70 loads and blade inertia peak at a very high point.

In my preferred embodiment, a centrifugally responsive droop stop mechanism is utilized of the type shown in FIG. 7. So as to limit the amount of droop which the blade can experience in its stopped or very low speed mode of operation, droop stop ring 160 is utilized. Ring 160 is slidably received on thru-shaft 34 and is spring biased by spring member 162 to its operable position shown in FIG. 7, which position is assumed when the blade is at stop or at very low rpm. Positive stop ring 164 cooperates with spring 162 to position the land 166 of droop stop ring 160 to be in alignment with the surface of the bearing outer race 22 which defines droop stop and flap stop. Accordingly, when the speed of blade 16 is reduced a sufficient amount, spring 162 forces droop stop ring 166 against positive stop ring 164 so as to place land 166 into alignment with surface and thereby limit the amount of droop which the blade can experience between the operating regime shown in FIG. 7 and the regime in which land 166 contacts surface. When the helicopter rotor 10 starts up, and gains sufficient rpm, centrifugal force acting on droop stop ring 160 overcomes the force of spring 162 and forces droop stop 160 out of alignment with surface 134-136, thereby permitting greater flapping and lead-lag motion of the blade in flight than is permitted in droop motion when in the low rpm or stopped mode of operation.

It will therefore be seen that in the rotor start-up operation, as rotor starting torque is applied, the inertia of the blade causes the blade to begin to rotate about its lag axis. This lag motion will continue until such point that it is arrested by some means. If blade 16 were allowed to increase the lag angle in this fashion, damper 70 would eventually bottom-out and cause a rapid deceleration in blade motion about the lag axis which would cause very high impact loads to be placed upon the blade and rotor system. This very high impact loading is beyond the capability of spherical bearing 28 in shear, so we accordingly provide hard stop 134 to cooperate with the bottomed-out damper in carrying this load.

It will be evident that the loading on bearing 28 during the rotor braking operation is just the opposite of that shown in FIGS. 3 through 6 which illustrate the rotor start-up operation, so that piston 70 bottoms-out at the opposite end of its stroke from the FIG. 6 showing and so that blade 16 bottoms out at lead stop 136.

It will accordingly be seen that the aforementioned French patent to Dorand has a serious problem in the starting and braking modes of operation and that while U.S. Pat. Nos. 3,501,250 and 3,111,172 utilize centering bearings in combination with the spherical bearing to solve this problem, I have eliminated the need for the spherical bearing, thereby providing a lighter and less expensive construction.

I wish it to be understood that I do not desire to be limited to the exact details of construction shown and described, for obvious modifications will occur to a person skilled in the art.

I claim:

1. An articulated helicopter rotor comprising:
    A. a rotatable hub member adapted to be mounted for rotation about an axis and having:
        1. a chamber defining member shaped to define a blade attachment chamber and to further define a substantially circular aperture at said chamber radially outer end, and further being shaped to present a spherical surface along the inner surface thereof, which spherical surface is centered about the intersection of the blade lead-lag and flapping axes,
    B. blade attachment means including:
        1. a shaft member positioned concentrically about the blade feathering axis and extending from within said chamber through said aperture and outwardly thereof for attachment to and support of the helicopter blade and being flange shaped at its radial inner end within said chamber,
        2. bearing means connecting said shaft member to said chamber defining member and including:
            a. a spherical, laminated elastomeric bearing with the laminates thereof centered about said lead-lag and flapping axes intersection and being annular in shape so as to envelop said shaft member in spaced relation thereto and with the outer laminate thereof connected to said chamber defining member spherical surface to form a bearing outer race, b. a flat, laminated elastomeric bearing and being annular in shape so as to envelop said shaft in space relation thereto and comprising a plurality of stacked, flat annular discs connected to said shaft flange at one of its ends and extending toward said spherical bearing, c. a connecting member enveloping said shaft member in spaced relation thereto and positioned between said spherical elastomeric bearing and said flat elastomeric bearing and shaped at one of its ends to be spherical and centered about said flapping and lead-lag axes intersection and connected to said spherical elastomeric bearing so as to serve as the inner race thereof and being connected to said flat elastomeric bearing at the opposite end thereof so that said spherical elastomeric bearing and said flat elastomeric bearing are connected in series relationship between said shaft member and said chamber defining means and so that said spherical elastomeric bearing accommodates the blade motion about the lead-lag and the flapping axes and so that said spherical elastomeric bearing and said flat elastomeric bearing cooperate to carry blade centrifugal loading and further cooperate to share blade pitch-change motion.

2. A rotor according to claim 1 wherein said spherical elastomeric bearing and said flat elastomeric bearing are of selected different torsional stiffness so as to selectively share the accommodation of blade pitch change motion.

3. A rotor according to claim 1 wherein said spherical elastomeric bearing is of substantially greater torsional stiffness than is said flat elastomeric bearing so that said spherical bearing is of minimal height, so that said flat elastomeric bearing will accommodate a greater portion of pitch change motion of the blade than does the spherical elastomeric bearing.

4. A rotor according to claim 1 wherein said spherical bearing is of minimum height dimension and hence minimum space envelope and of selected torsional stiffness with respect to the torsional stiffness of said flat bearing so that said spherical bearing accommodates a minimal portion of said blade pitch change motion and said flat bearing accommodates the remainder of the required accommodation for blade pitch change motion.

5. A rotor according to claim 1 wherein said shaft member is shaped to form a reduced diameter stubshaft at the point of connection to said damper member so as to reduce the size of said journal bearing and said elastomeric bearing.

6. A rotor according to claim 1 wherein said blade attachment means supports said shaft member and hence said blade to permit blade pitch change motion through an angle of about 60°, to permit blade lead-lag motion through an angle of about 20°, and to permit blade flapping motion through an angle of about 30°.

7. An articulated helicopter rotor adapted to mount one or more helicopter blades to extend substantially radially therefrom for motion about a blade feathering axis and intersecting blade lead-lag and blade flapping axes including:

A. a rotor hub adapted to be mounted for rotation about an axis of rotation,
B. blade attachment means including:
1. an annular, spherical, laminated, elastomeric bearing having:
  a. an outer spherical race connected to said hub and shaped to define a central opening enveloping the blade feathering axis,
  b. an inner spherical race shaped to define a central opening positioned concentrically about the blade feathering axis, and with the spherical surfaces of the inner and outer race centered about the intersection of the blade flapping and lead-lag axes,
2. and annular, disc-type, laminated, elastomeric bearing having a central opening enveloping the blade feathering axis and with the disc-shaped laminates thereof lying in planes perpendicular thereto,
3. means connecting said spherical and disc-type elastomeric bearings so that they are joined in series, and
4. a shaft member adapted to connect to the blade and extending along the blade feathering axis and passing through said spherical bearing and disc-type bearing central openings and connecting at its radially inner end to said stack-type bearing so that said blade carrying shaft member is supported from said hub through said in-series bearings with freedom of motion about the blade feathering, lead-lag and flapping axes and with the spherical bearing accommodating the lead-lag and flapping motions and with the two bearings cooperating to share the pitch change motion.

8. A rotor according to claim 7 wherein said disc-type bearing is positioned closer to the hub axis of rotation than said spherical bearing.

9. A rotor according to claim 8 and including a lead-lag damper connected to the radially inner end of said shaft member to dampen lead-lag motion thereof about the lead-lag axis.

10. A rotor according to claim 7 wherein said spherical elastomeric bearing and said disc-type elastomeric bearing are concentric about the blade feathering axis, wherein the laminates of the spherical elastomeric bearing are alternate layers of elastomer and rigid spherical members bonded to one another and to the bearing inner and outer race, wherein the laminates of said disc-type bearing are alternate elastomer discs and rigid discs bonded to one another and connected to the connecting means and the shaft member at the opposite ends of the disc stack.

11. A rotor according to claim 10 wherein the laminates of the spherical bearing have inner surfaces which cooperate to form a cone with respect to the shaft member.

12. A rotor according to claim 7 wherein said blade attachment means supports said shaft member and hence said blade to permit blade pitch change motion through an angle of about 60°, to permit blade lead-lag motion through an angle of about 20°, and to permit blade flapping through an angle of about 30°.

13. A rotor according to claim 7 wherein said spherical elastomeric bearing is of greater torsional stiffness than said disc-type elastomeric bearing so that said spherical bearing is of minimal height, so that said disc-type elastomeric bearing will accommodate a greater share of the blade pitch change motion, and so that said spherical bearing will accommodate blade lead-lag and flapping motion.

14. A helicopter rotor according to claim 7 wherein said blade end shaft is shaped to form a reduced diameter stub-shaft at the point of attachment of said damper means so as to minimize the size of said journal bearing and said elastomeric bearing.

15. In an articulated helicopter rotor wherein the helicopter blades are supported substantially radially from a rotatable hub for rotation therewith about an axis of rotation and for motion with respect thereto about a lead-lag axis, flapping axis and a feathering axis, the improvement of a joint connecting the blade to the hub comprising:
  A. an annularly shaped, laminated, elastomeric spherical bearing having inner and outer races and stacked laminates of spherical shape centered about the intersection of the lead-lag and flapping axes and positioned substantially concentrically about the feathering axis,
  B. an annularly shaped, disc-type elastomeric bearing comprising a stack of annular, flat disc laminates positioned substantially concentrically about the feathering axis,
  C. an annular connecting member concentrically enveloping the feathering axis and connected to the inner race of said spherical bearing and further connected to one end of the stacked discs of said disc-type bearing so as to connect said bearings in series,
  D. a thru-shaft passing through said spherical bearing connecting member and disc-type bearing and adapted to be connected at one end to the helicopter blade and connected at its opposite end to the opposite end of the disc-type bearing, and
  E. means connecting said spherical bearing outer race to said hub so that said blade is supported from said hub through said joint so as to be capable of lead-lag and flapping motion which is accommodated through the torsional motion of said spherical bearing, and so as to also be capable of pitch change motion which is accommodated through the cooperation of said disc-type bearing and said spherical bearing and so that both of said bearings cooperate to impart the blade centrifugal loads to the hub.

16. A rotor according to claim 15 wherein the improved joint supports said connecting member and hence the blade for pitch change motion through about a 60° angle, for lead-lag motion hrough about a 20° angle, and for flapping motion through about a 30° angle.

17. A rotor according to claim 15 wherein said spherical elastomeric bearing is of greater torsional stiffness than said disc-type elastomeric bearing so that said spherical bearing is of minimal height, so that said disc-type elastomeric bearing will accommodate a greater share of the blade pitch change motion, and so that said spherical bearing will accommodate blade lead-lag and flapping motion.

18. In an articulated helicopter rotor wherein the helicopter blades are supported substantially radially from a rotatable hub for rotation therewith about an axis of rotation and for motion with respect thereto about a lead-lag axis, a flapping axis and a feathering axis, the improvement of a joint connecting the blade to the hub comprising:
  A. a spherical elastomeric bearing having inner and outer races and elastomer filler therebetween of spherical shape centered about the intersection of the lead-lag and flapping axes,
  B. a disc-type elastomeric bearing,
  C. a connecting member connected to the inner race of said spherical bearing and further connected to one end of said disc-type bearing so as to connect said bearings in series,
  D. a thru-shaft passing through said spherical bearing, connecting member and a disc-type bearing and adapted to be connected at one end to the helicopter blade and connected at its opposite end to the opposite end of the disc-type bearing, and
  E. means connecting said spherical bearing outer race to said hub so that said blade is supported from said hub through said joint so as to be capable of lead-lag and flapping motion which is accommodated through the torsional motion of said spherical bearing, and so as to also be capable of pitch change motion which is accommodated through the cooperation of said disc-type bearing and said spherical bearing and so that both of said bearings cooperate to impart the blade centrifugal loads to the hub.

19. A rotor according to claim 18 wherein the improved joint supports said connecting member and hence the blade for pitch change motion through about a 60° angle, for lead-lag motion through about a 20° angle, and for flapping motion through about a 30° angle.

20. A rotor according to claim 18 wherein said spherical elastomeric bearing is of greater torsional stiffness than said disc-type elastomeric bearing so that said spherical bearing is of minimal height, so that said disc-type elastomeric bearing will accommodate a greater share of the blade pitch change motion, and so that said spherical bearing will accommodate blade lead-lag and flapping motion.

* * * * *